United States Patent

Pushpalal et al.

[11] Patent Number: 6,099,947
[45] Date of Patent: Aug. 8, 2000

[54] HYBRID MATERIAL AND METHOD OF MANUFACTURING THE SAME

[75] Inventors: Game Kankanamge Dinilprem Pushpalal; Tadashi Kobayashi, both of Sakata, Japan

[73] Assignee: Maeta Techno-Research, Inc., Yamagata-Ken, Japan

[21] Appl. No.: 09/194,654

[22] PCT Filed: Jun. 5, 1998

[86] PCT No.: PCT/JP98/02505

§ 371 Date: Nov. 30, 1998

§ 102(e) Date: Nov. 30, 1998

[87] PCT Pub. No.: WO99/64232

PCT Pub. Date: Dec. 16, 1999

[51] Int. Cl.[7] .............. B32B 9/00; B32B 15/00; C04B 7/02
[52] U.S. Cl. ............ 428/295.4; 428/98; 428/107; 428/113; 428/114; 428/141; 428/220; 428/221; 428/294.7; 428/297.4; 428/299.1; 427/407.1
[58] Field of Search ............. 428/98, 107, 113, 428/114, 141, 220, 221, 294.7, 295.4, 297.4, 299.1; 427/407.1

[56] References Cited

U.S. PATENT DOCUMENTS 4,316,925  2/1982  Delmonte .

FOREIGN PATENT DOCUMENTS

| 779339 | 5/1972 | Belgium . |
| 0645239 | 3/1995 | European Pat. Off. . |
| 2909179 | 9/1980 | Germany . |
| 664076 | 3/1994 | Japan . |

OTHER PUBLICATIONS

N. McN. Alford and J.D Birchall, "Fibre toughening of MDF cement", Journal of Materials Science 20, pp. 37–45, 1985. ICI New Science Group, PO Box 8, The Health, Runcorn, Cheshire, UK (Exhibit B).

*Primary Examiner*—Richard Weisberger
*Attorney, Agent, or Firm*—John P. White; Cooper & Dunham LLP

[57] ABSTRACT

A hybrid material comprising a substrate prepared by curing a fabricated material made of a mixture of one or more kinds of organic binders and at least one kind of inorganic powders, and at least one unidirectional fiber layer which is comprised from one or more kinds of fibers, adhered to at least one of outer surfaces of the substrate by resin impregnation, wherein $E_f/E_s$ satisfies the following relational formula (1) and $E_f \cdot t_f / E_s \cdot t_s$ satisfies the following relational formula (2), $$E_f/E_s > 1 \quad (1)$$

$$E_f/E_s \geq E_f \cdot t_f / E_s \cdot t_s \geq 0.15 \quad (2)$$

where $E_f$ is bending modulus of elasticity of the resin impregnated unidirectional fiber layer, $E_s$ is bending modulus of elasticity of the substrate, $t_f$ is thickness of resin impregnated unidirectional fiber layer and $t_s$ is thickness of the substrate. Therefore, the hybrid material excels in bending strength, tensile strength, fatigue strength and impact strength.

17 Claims, 1 Drawing Sheet

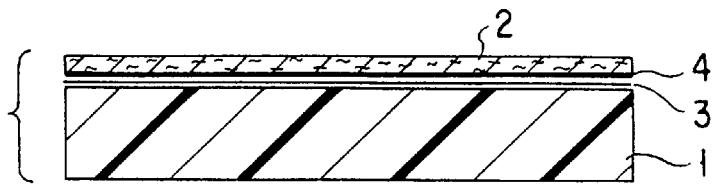
F I G. 1
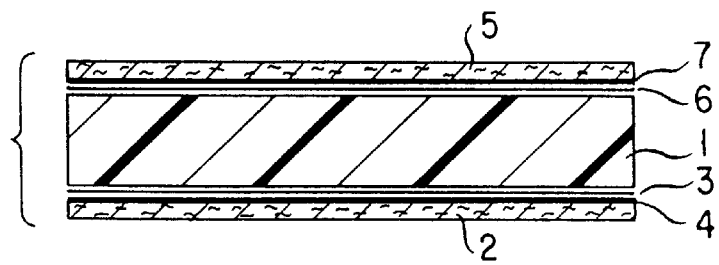
F I G. 2
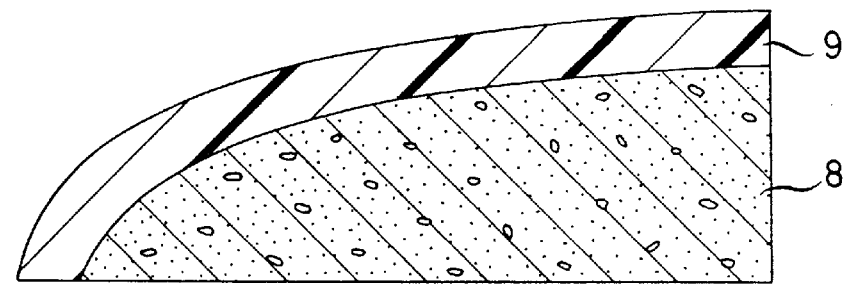
F I G. 3
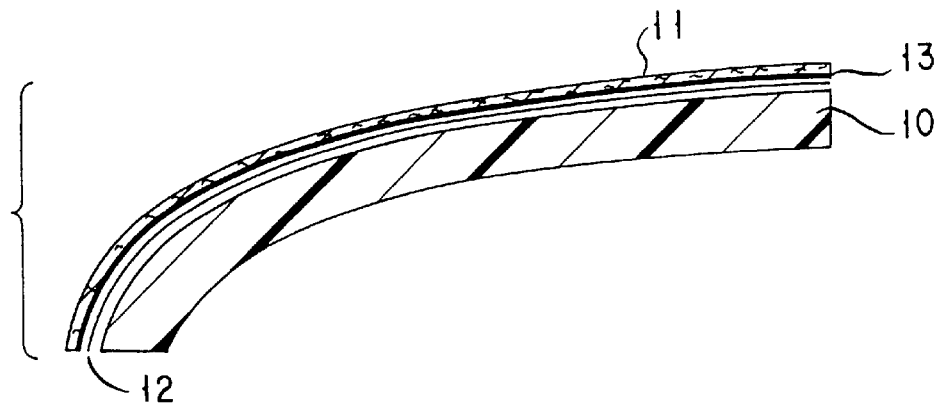
F I G. 4

HYBRID MATERIAL AND METHOD OF MANUFACTURING THE SAME

TECHNICAL FIELD

The present invention relates to producing a very high bending strength hybrid material good for use as body material of vehicles, airplanes, ships etc. by sticking at least one high modulus unidirectional fiber layer on the outer surfaces of the chemically bonded inorganic powder substrate.

This invention also relates to improvement on a chemically bonded inorganic powder substrate having higher bending strength, tensile strength, impact strength, fatigue strength and work of fracture.

BACKGROUND ART

There are known various polymer composites such as fiber reinforced plastics utilized in civil, architectural, chemical and transportation industries. In general, these fiber reinforced plastics contain a very large amount of resin that is more than 50 vol. % of the total volume of the final product. This higher volume of resin facilitates forming by methods, such as filament winding, pultrusion, lamination etc. However, this large amount of resin leads time-dependent permanent creep deformation of fiber reinforced plastics that occurs under stress even at ambient temperature and also in moderately elevated temperatures. Furthermore, fiber reinforced plastics now face a knotty problem of how to be recycled or disposed without environmental damage. Therefore, there is a growing interest in high strength materials that could be form into shapes utilizing minimum amount of resin so that minimize the environmental damage.

The article entitled as "Fiber toughening of MDF cement" (Journal of Materials Science, 20, 1985, pp. 37–45) revealed a method for reinforcing a polymer cement composite known as the Macro Defect Free cement. Macro Defect Free cement contains very low amount of polymer, say, less than 15 vol. % of the total volume of the product. It was shown that method of lamination fiber mats between polymer cement composite sheets then followed a hot pressing at 80° C. for 10 min. Stress-strain curves of this material have shown the failure of polymer cement matrix at rather lower stress, say, less than 150 MPa. In terms of bending modulus of elasticity and bending strength there were no advantages in the incorporation of fiber mats into polymer cement matrix while it has shown little improvement in strength. Furthermore, the material is very susceptible to moisture.

On the other hand, Japanese Patent Laid-Open No. 64076/1994 discloses a method of reinforcing polymer free brittle material by sticking unidirectional fiber layers on the outer surface of a brittle material substrate. However, bending strength of the final product is very low, say, lower than 30 MPa. The reason of this is lower fracture elongation of the substrate. Therefore, the material which was disclosed by Japanese Patent Laid-open No. 64076/1994 would not be work as a substitution for the fiber reinforced plastics or would not be fulfill the high strength material requirements.

DISCLOSURE OF INVENTION

It is an object of the present invention is to produce hybrid material having higher bending strength, tensile strength, impact strength, fatigue strength and work of fracture; hybrid material having higher strength, such as bending strength of more than 30 MPa and preferably more than 150 MPa.

Another object of the present invention is to provide a method of manufacturing a hybrid material having all properties described above.

The hybrid material according to the invention contains low amount of organic binder preferably less than 50 vol. % of the total volume of the final product. It can be easily formed into three dimensional shapes and can be easily machined. The hybrid material has higher durability such as water resistance, chemical resistance or weather resistance.

According to an aspect of the present invention, there is provided a hybrid material comprising:

a substrate prepared by curing a fabricated material made of a mixture of one or more kinds of organic binders and at least one kind of inorganic powders; and at least one unidirectional fiber layer which is comprised from one or more kinds of fibers, adhered to at least one of outer surfaces of the substrate by resin impregnation, wherein $E_f/E_s$ satisfies the following relational formula (1) and $E_f t_f/E_s t_s$ satisfies the following relational formula (2), $$E_f/E_s > 1 \tag{1}$$

$$E_f/E_s \geq E_f t_f/E_s t_s \geq 0.15 \tag{2}$$

where $E_f$ is bending modulus of elasticity of the resin impregnated unidirectional fiber layer, $E_s$ is bending modulus of elasticity of said substrate, $t_f$ is thickness of resin impregnated unidirectional fiber layer and $t_s$ is thickness of said substrate.

BRIEF DESCRIPTION OF DRAWINGS

FIG. 1 is a cross sectional view illustrating a substrate and reinforcement fiber layers adhered to the one outer surface of the substrate.

FIG. 2 is a cross sectional view illustrating a substrate and reinforcement fiber layers adhered to the both outer surfaces of the substrate.

FIG. 3 is a cross sectional view illustrating a mold and a shaped substrate before being cured.

FIG. 4 is a cross sectional view illustrating a shaped substrate after being cured and reinforcement fiber layers adhered to the one outer surface of the substrate.

BEST MODE OF CARRYING OUT THE INVENTION

The present invention provides a substrate with high strength and high fracture elongation. By the term "substrate" we mean straight or shaped thin material upon which bonding agents, primers, coatings, adhesives could be applied and bonded together by adhesives with reinforcement fiber layers. In order to make substrate with high strength and high fracture elongation, inventors used at least one organic binders to bind inorganic particles. Examples of organic binders for this purpose include epoxy resin, unsaturated polyester resin, vinyl ester resin, urethane resin, polyvinyl alcohol, polyacrylamide, polyamide and formaldehyde resin precursor. Such binders being added in proportions up to 50 volume parts relative to 100 volume parts of inorganic powder. It should be noted that the blend ratio of organic binder is set while it has no solvent included. Inventors are more concerned to reduce binder content as much as possible in order to reduce environmental damage occurs in disposing the material and also reduce the creep deformation. However, the use of such amount of organic binders does give an improvement in bending strength of the substrate in excess of 30 MPa, preferably in excess of 60 MPa and more preferably in excess of 80 MPa. Furthermore, the use of such amount of organic binders does give an improvement in fracture elongation of the substrate in excess of 0.03%, preferably in excess of 0.1% and more preferably in excess of 0.2%.

The present invention also provides inorganic powders having good affinity with at least one kind of above mentioned organic binders. We have found that oxides, hydroxides, sulfates, carbonates and other complex compounds of Ca, Si and Al are the best inorganic powders which have good affinity with organic binders. Examples for this include alumina powder, aluminum hydroxide powder, silica powder, calcium carbonate powder, calcium sulfate powder and many hydraulic cements. By the term "hydraulic cement" we mean any material which sets and hardens by the addition of water, and which thus sets and hardens in the presence of water. The hydraulic cement may be a silicate cement, for example Portland cement, or more preferably aluminate cement, for example calcium aluminate cement. Mixtures of two or more different hydraulic cements or other inorganic powders may be used if desired. However, we have found that at least 20 volume parts, preferably at least 30 volume parts, more preferably at least 50 volume parts relative to 100 volume parts of said inorganic powders should be comprised of a hydraulic cement in order to obtain a high bending strength.

In the present invention, the inventors used some specialized mixing and forming techniques in order to produce the substrate with low binder/inorganic powder ratio. For example, the composition may be mixed on a Banbury mixer, kneader or in a screw extruder. However, the composition is most preferably mixed under conditions of high shear on a twin roll mill by passing the composition repeatedly through the nip between the rolls of the mill, this procedure producing a thoroughly well mixed composition. After mixing the composition it may be formed into sheets by calendering through the twin roll mill, by passing through the screw extruder or heat pressing.

The present invention also provides a reinforcing unidirectional fiber sheet having high modulus of elasticity, high permissible elongation and strength. As a general guide it is preferred to use fibers having a modulus of elasticity of at least 70 GPa although we do not exclude the use of fibers having modulus lower than 70 GPa. Examples of fibers for this purpose include carbon fiber, Si—Ti—C—O fiber, aramid fiber and glass fiber. According to the invention these fiber sheets should be adhered to the outer surface of the substrate by resin which is impregnated in the fibers.

Applicable resins for impregnation of the fiber sheets include epoxy resin, unsaturated polyester resin, vinyl ester resin, urethane resin and formaldehyde resin.

However, according to the results of an experiment carried out by the present inventors, it is preferable for this purpose to use substantially reactable resins with the organic binder and/or inorganic powders of the substrate. The reason for this is to improve the bonding strength of interface between the substrate and the fiber.

Furthermore, room temperature setting type resins made to set at the room temperature by adding hardeners or thermosetting resins which hardened at elevated temperatures are applicable to the purpose. However, we preferred to use resins with higher modulus of elasticity. The reason for this is to obtain a fiber layer with high modulus of elasticity after resin impregnation. Needless to say, the impregnation of resin reduces the original modulus of elasticity of fibers, for example, carbon fibers having original modulus of elasticity of 240 GPa has given lower modulus of elasticity about 100 GPa after impregnation. We have found that in order for high bending strength to be obtained in a fiber reinforced hybrid material it is necessary to ensure that bending modulus of elasticity of fibers after resin impregnation should be greater than defined minimum value relative to the bending modulus of elasticity of substrate.

The present invention also provides following two essential conditions in order to obtain very high strength hybrid material. As the first essential requirement it is preferred that the ratio between bending modulus of elasticity of resin impregnated fiber layers $E_f$ and bending modulus of elasticity of substrate $E_s$ should be greater than 1.0. That is:

$$E_f/E_s > 1$$

It should be noted that the term $E_f$ should essentially be the modulus of elasticity in bending of the strips which are made by said unidirectional fibers by resin impregnation. Thus, this modulus of elasticity is smaller than modulus of elasticity of fibers before resin impregnation.

A relation $E_f/E_s \leq 1$ leads to cracking of substrate at first nonlinear deflection of the hybrid material that initiates from tension side of the substrate where substrate—fiber layer interface. By the term "first nonlinear deflection" we mean the stage which initiates the plastic deformation of the hybrid material. Beyond this point deflection is not linearly proportional to the stress or the load.

As the second essential requirement it is preferred that resin impregnated unidirectional fiber layers having thickness $t_f$ and bending modulus of elasticity $E_f$ satisfying the following relational formula relative to the thickness $t_s$ and bending modulus of elasticity $E_s$ of the substrate:

$$E_f/E_s \geq E_f t_f/E_s \cdot t_s \geq 0.15$$

A relation $E_f/E_s < E_f t_f/E_s \cdot t_s$ occurs when thickness of fiber layers $t_f$ is higher than thickness of substrate $t_s$. This leads to cracking or crushing of substrate in compression side at lower loads than failure load. On the other hand the reinforcing fiber layer peeled off and no satisfactory enhancement of bending strength when $E_f t_f/E_s \cdot t_s$ is smaller than 0.15.

As shown in FIG. 1, the general process comprises the steps of making a hybrid material; curing of the substrate sheet 1; applying a primer coat 3 and a resin 4 onto the surface of a substrate sheet 1; then adhering one or more fiber sheets 2; and impregnating the fiber sheets 2 with the resin by pressing. When adhering second fiber sheet onto the already adhered sheet the resin may be applied again onto the already adhered sheet. Then, after the placing second fiber sheet on the already adhered sheet the resin should be impregnated by a hand roller. Subsequently, the fiber reinforced substrate is cured by heating, or when using a room temperature setting resin, by leaving the product at room temperature to convert the hybrid material.

As shown in FIG. 2, an alternative process comprises the steps of making a hybrid material; curing of the substrate sheet 1; applying a primer coat 3 and a resin 4 onto the surface of a substrate sheet 1; then adhering one or more reinforcing fiber sheets 2; and impregnating the reinforcing fiber sheets 2 with the resin by pressing. When adhering second fiber sheet onto the already adhered sheet the resin may be applied again onto the already adhered sheet. Then, after the placing second fiber sheet on the already adhered sheet the resin should be impregnated by a hand roller. Subsequently, the fiber reinforced substrate is cured by heating, or when using a room temperature setting resin, by leaving the product at room temperature. After setting of the resin, fiber reinforced sheet is turned upside down. Then, it should be followed again steps of applying a primer coat 6 and a resin 7 onto the surface of the substrate sheet 1; then adhering one or more reinforcing fiber sheets 5; and impregnating the reinforcing fiber sheets 5 with the resin by pressing. A plurality of such sheets can be applied to the surface, if desired.

As shown in FIG. 3, an alternative practice comprises the steps of making hybrid material; a shaped substrate sheet 9 using a mold 8 especially a mold such as concrete mold, plaster of paris mold or cast-iron mold. A substrate having at least one kind of organic binder selected from the group consisting of epoxy resin, unsaturated polyester resin, vinyl ester resin, urethane resin, polyvinyl alcohol, polyacrylamide, polyamide and formaldehyde resin precursor and inorganic powders such as alumina powder, aluminum hydroxide powder, silica powder, calcium carbonate powder, calcium sulfate powder and hydraulic cements should be mixed and formed into a sheet by roll milling or extrusion. Then this sheet should be moved onto a desired mold 8 and manipulated into the desired shape while it is flexible. The sculpted sheet 9 and the mold 8 should be put in an oven together as they are, for curing. The hardened work should be removed from the mold 8 after being cured at desired temperature and time. Then fiber reinforcing process may be started. As shown in FIG. 4, this operation comprises the steps of applying a primer coat 12 and a resin 13 onto the surface of the shaped substrate 10; then adhering one or more reinforcing fiber sheets 11; and impregnating the reinforcing fiber sheets 11 with the resin by pressing. If desired, a plurality of such sheets can be applied to the surface.

The invention is illustrated by the following examples in which all parts are expressed as parts by volume.

EXAMPLE 1

Preparation of the Substrate 100 parts of calcium aluminate cement, 31.5 parts of substantially water insoluble phenol resin precursor, 31.5 parts of methanol (solvent of phenol resin precursor), 4.5 parts of N-methoxymethyl 6-nylon (viscosifier), and 5.5 parts of glycerol (plasticizer) were mixed in a kneader style mixer into the form of a crumble. The crumble was then charged to a twin roll mill and formed into a sheet on the mill, the sheet being passed repeatedly through the nip between the rolls of the mill in order to thoroughly mix the composition. The sheet was then removed from the mill, placed between two alumina plates, and was subjected to cure at 200° C. for 18 hours to form a hardened product.

Preparation of Reinforcement

Above substrate sheet was reinforced by applying a primer coat and a room temperature setting epoxy resin onto the surface of the substrate sheet, then adhering one unidirectional carbon fiber sheet, and impregnating the carbon fiber sheet with the resin by pressing. Subsequently, the fiber reinforced substrate is cured by leaving the product at room temperature for a week to convert the hybrid material.

A "Forca Tow Sheet FTS-C1-20" as the carbon fiber sheet, "FP Primer FP-NS" as the primer, and "FR Resin FR-E3P" an epoxy resin adhesive as the impregnating resin, all of these manufactured by Tonen Corporation were used.

The fabricated hybrid sheet was cut into 20 mm wide and 150 mm long strips parallel to the direction of the fibers. Bending strength, bending modulus of elasticity and the tensile strength of the strips were determined in accordance with the guidance of JIS K 6911 (Testing methods for thermosetting plastics). Fiber reinforced surface was in the bottom of the specimens when specimens were tested for bending strength and modulus of elasticity. It should be noted that bending strength of a specimen is stress of the specimen at first crack load. The work of fracture of specimen was determined by dividing the area under the load-deflection curve by the cross-sectional area of the specimen. The works of fracture were determined on unnotched specimens.

Impact strength was determined by using Charpy Impact Testing Machine in accordance with the guidance of JIS K 7111 (Method of Charpy Impact Test for Rigid Plastics).

Fatigue strength was determined in accordance with general rules for testing fatigue of rigid plastics as described in JIS K 7118. Table 1 shows the results of 3.35 mm thick hybrid material specimens.

TABLE 1

| Bending strength (MPa) | 487 |
|---|---|
| Bending modulus of elasticity (GPa) | 40.2 |
| Work of fracture (kJ/m$^2$) | 71.6 |
| Tensile strength (MPa) | 398 |
| Fatigue strength (MPa) | 197 |
| Impact strength (kJ/m$^2$) | 73.8 |

The effects of the reinforcing fiber on bending strength, cracking or crushing of substrate in compression side at lower loads, peeling of reinforcing fiber layer, crack initiation at substrate-fiber layer interface etc. were evaluated.

Bending modulus of elasticity of resin impregnated unidirectional fiber layers:

$E_f$ in GPa

Thickness of resin impregnated unidirectional fiber layers:

$t_f$ in mm

Bending modulus of elasticity of the substrate:

$E_s$ in GPa

Thickness of the substrate:

$t_s$ in mm were measured.

The results were arranged in terms of the ratios $E_f/E_s$ and $E_f t_f / E_s t_s$ on the assumption as described above. Details of measuring $E_f$ and $E_s$ are as follows.

To measure $E_f$ the above mentioned resin was impregnated into the 6 carbon fiber sheets. After curing at room temperature for a week, fabricated sheet was cut into 20 mm wide and 100 mm long strips parallel to the direction of the fibers. Bending strength and modulus of elasticity of the strips were determined in accordance with the guidance of JIS K 6911 (Testing methods for thermosetting plastics). $E_f$ was 96 GPa and $t_f$ was 0.25 mm.

To measure $E_s$ substrate which was made accordance with above mentioned method was cut into 20 mm wide and 100 mm long strips. Bending strength and modulus of elasticity of the strips were determined in accordance with the guidance of JIS K 6911 (Testing methods for thermosetting plastics). $E_s$ was 25 GPa and $t_s$ was 3.1 mm.

This resulted in: $E_f/E_s=3.84$ and $E_f t_f/E_s t_s=0.31$. Therefore these values satisfy the essential requirements claimed in this invention. Hybrid material had a high bending strength and did not show cracks in substrate prior to failure load.

EXAMPLES 2 TO 5 AND COMPARATIVE EXAMPLE 1

In Examples 2 to 5 and Comparative Example 1 substrate sheet was prepared according to given mix proportions and methods described in Example 1. In Examples 2, 3 and Comparative Example 1 unidirectional carbon fiber sheets known as "Forca Tow Sheet" manufactured by Tonen Corporation were used. In Example 4 unidirectional glass fiber sheets known as "Forca Tow Sheet FTS-GE-30" manufactured by Tonen Corporation were used. In Example 5 unidirectional Si—Ti—C—O fiber sheets known as "Tyranno" manufactured by Ube Industries, Ltd. were used. Fiber reinforcement layers were prepared as described in Example 1. Method of testing and evaluation of Examples 2 to 5 and Comparative Example 1 are equal to methods and evaluation given in Example 1.

Determination factors of Examples 2 to 5 are $E_f/E_s>1$ and $E_f/E_s \geq E_f \cdot t_f/E_s \cdot t_s \geq 0.15$ as shown in Table 2. Therefore these values satisfy the essential requirements claimed in this invention. Hybrid material had a high bending strength and did not show cracks in substrate prior to failure load.

In contrast, in the Comparative Example 1, in which $E_f/E_s < E_f \cdot t_f/E_s \cdot t_s$, the hybrid material showed compression cracks initiated at first nonlinear deflection, thus did not result in a satisfactory improvement of the bending strength.

was placed between two alumina plates, and was subjected to cure at 200° C. for 18 hours to form a fully-hardened product.

Preparation of Reinforcement

Fiber reinforcement was prepared and cured as described in Example 1.

TABLE 2

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Example 1 | carbon fiber FTS-C1-20 | 91 | 487 | 96 | 25 | 0.25 | 3.10 | 3.84 | 0.31 | ○ |
| Example 2 | carbon fiber FTS-C5-30 | 91 | 528 | 157 | 25 | 0.39 | 3.29 | 6.28 | 0.80 | ○ |
| Example 3 | carbon fiber FTS-C6-30 | 91 | 553 | 167 | 25 | 0.39 | 3.01 | 6.68 | 0.87 | ○ |
| Example 4 | Glass fiber FTS-GE-30 | 91 | 400 | 35.5 | 25 | 0.51 | 3.29 | 1.42 | 0.22 | ○ |
| Example 5 | Si—Ti—C—O fiber (Tyranno) | 91 | 421 | 91 | 25 | 0.30 | 3.10 | 3.64 | 0.35 | ○ |
| Comparative Example 1 | carbon fiber FTS-C1-20 | 95 | 165 | 96 | 24 | 0.80 | 0.70 | 4.00 | 4.57 | X |

EXAMPLE 6

Preparation of the Substrate 100 parts of calcium aluminate cement, 31.5 parts of substantially water insoluble phenol resin precursor, 31.5 parts of methanol (solvent of phenol resin precursor), 4.5 parts of N-methoxymethyl 6-nylon (viscosifier), and 5.5 parts of glycerol (plasticizer) were mixed in a kneader style mixer into the form of a crumble. The crumble was then charged to a twin roll mill and formed into a sheet on the mill, the sheet being passed repeatedly through the nip between the rolls of the mill in order to thoroughly mix the composition. The sheet was then removed from the mill and pressed under 6 MPa at 80° C. Then semi-hardened sheet Methods of testing and evaluation of Example 6 are equal to methods and evaluation given in Example 1.

Determination factors of Example 6 are $E_f/E_s>1$ and $E_f/E_s \geq E_f \cdot t_f/E_s \cdot t_s \geq 0.15$ as shown in Table 3. Therefore these values satisfy the essential requirements claimed in this invention. Hybrid material had a high bending strength and did not show cracks in substrate prior to failure load.

TABLE 3

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Example 6 | carbon fiber FTS-G1-20 | 186 | 653 | 96 | 37 | 0.25 | 2.30 | 2.59 | 0.28 | ○ |

EXAMPLE 7

Preparation of the Substrate 75 parts of alumina powder, 25 parts of calcium aluminate cement, 31.5 parts of substantially water insoluble phenol resin precursor, 31.5 parts of methanol (solvent of phenol resin precursor), 4.5 parts of N-methoxymethyl 6-nylon (viscosifier), and 5.5 parts of glycerol (plasticizer) were mixed in a kneader style mixer into the form of a crumble. The crumble was then charged to a twin roll mill and formed into a sheet on the mill, the sheet being passed repeatedly through the nip between the rolls of the mill in order to thoroughly mix the composition. The sheet was then removed from the mill, placed between two alumina plates, and was subjected to cure at 200° C. for 18 hours to form a hardened product.

Preparation of Reinforcement

Fiber reinforcement was prepared and cured as described in Example 1.

Methods of testing and evaluation of Example 7 are equal to methods and evaluation given in Example 1.

Determination factors of Example 7 are $E_f/E_s>1$ and $E_f/E_s \geq E_f \cdot t_f/E_s \cdot t_s \geq 0.15$ as shown in Table 4. Therefore these values satisfy the essential requirements claimed in this invention. Hybrid material had a high bending strength and did not show cracks in substrate prior to failure load.

6 MPa at 80° C. Then semi-hardened sheet was placed between two alumina plates, and was subjected to cure at 80° C. for 24 hours to form a fully-hardened product.

Preparation of Reinforcement

Fiber reinforcement was prepared and cured as described in Example 1.

Methods of testing and evaluation of Example 8 are equal to methods and evaluation given in Example 1.

Determination factors of Example 8 are $E_f/E_s>1$ and $E_f/E_s \geq E_f \cdot t_f/E_s \cdot t_s \geq 0.15$ as shown in Table 5. Therefore these values satisfy the essential requirements claimed in this invention. Hybrid material had a high bending strength and did not show cracks in substrate prior to failure load.

TABLE 4

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Example 7 | carbon fiber FTS-C1-20 | 41 | 261 | 96 | 17 | 0.25 | 2.56 | 5.65 | 0.55 | ○ |

EXAMPLE 8

Preparation of the Substrate 100 parts of calcium aluminate cement, 18.9 parts of polyvinyl alcohol, 32.4 parts of water, and 2.2 parts of

TABLE 5

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Example 8 | carbon fiber FTS-C1-20 | 169 | 606 | 96 | 36 | 0.25 | 2.01 | 2.67 | 0.33 | ○ | glycerol (plasticizer) were mixed in a kneader style mixer into the form of a crumble. The crumble was then charged to a twin roll mill and formed into a sheet on the mill, the sheet being passed repeatedly through the nip between the rolls of the mill in order to thoroughly mix the composition. The sheet was then removed from the mill and pressed under

EXAMPLE 9, 10 AND COMPARATIVE EXAMPLE 2

Preparation of the Substrate 84 parts of sand, 16 parts of calcium carbonate powder and 33 parts of polyester resin were mixed in a planetary mixer. The mix was cast into a 200×200×5.5 mm thick wooden mold and 200×200×10 mm thick wooden mold; and cured at 80° C. for 6 hours. The hardened products were then removed from the mold.

Preparation of Reinforcement

Fiber reinforcement was prepared and cured as described in Example 1.

Methods of testing and evaluation of Example 9, 10 and Comparative Example 2 are equal to methods and evaluation given in Example 1.

Determination factors of Example 9 and 10 are $E_f/E_s>1$ and $E_f/E_s \geq E_f t_f/E_s \cdot t_s \geq 0.15$ as shown in Table 6. Therefore these values satisfy the essential requirements claimed in this invention. Hybrid material had a high bending strength and did not show cracks in substrate prior to failure load.

In contrast, in the Comparative Example 2, in which $E_f t_f/E_s \cdot t_s < 0.15$, the hybrid material showed that cracks run longitudinally through the substrate-fiber layer interface at first nonlinear deflection, thus did not result in a satisfactory improvement of the bending strength.

product based on calcium silicate. It should be noted that this material does not contain any organic substance as its ingredient. For the comparison purpose two grades of "Adoceram-CS" were selected, in which one has a bending modulus of elasticity larger than bending modulus of elasticity of resin impregnated carbon fibers, FTS-C1-20 and other has a bending modulus slightly lower than the bending modulus of elasticity of resin impregnated carbon fibers, FTS-C1-20.

Unidirectional carbon fiber layers were adhered on the surface of the "Adoceram-CS" ceramics sheets using epoxy resin as described above in Example 1.

Methods of testing and evaluation of Comparative Examples 3, 4 and 5 are equal to methods and evaluation given in Example 1. The results are shown below in Table 7.

TABLE 6

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Example 9 | carbon fiber FTS-C1-20 | 38 | 262 | 96 | 21 | 0.25 | 5.41 | 4.57 | 0.21 | ○ |
| Example 10 | carbon fiber FTS-C1-20 | 38 | 280 | 96 | 21 | 0.50 | 5.48 | 4.57 | 0.42 | ○ |
| Comparative Example 2 | carbon fiber FTS-C1-20 | 38 | 65 | 96 | 21 | 0.25 | 10.00 | 4.57 | 0.12 | X |

COMPARATIVE EXAMPLE 3, 4 AND 5

For further comparison carbon fiber layers were adhered on the surface of ceramics sheets. These ceramics sheets are commercially available and manufactured by Chichibu Onoda Cement Corporation with the trade name of "Adoceram-CS." "Adoceram-CS" is a kind of sintering In the Comparative Examples 3 and 4 in which having a ratio $E_f/E_s$ below the demanded limit in the present invention, the hybrid material suffered from tension cracks that started from the substrate-fiber layer interface at first nonlinear deflection. Furthermore, in Comparative Example 5, in which $E_f t_f/E_s \cdot t_s < 0.15$, the hybrid material showed that cracks run longitudinally through the substrate-fiber layer interface at first nonlinear deflection, thus did not result in a satisfactory improvement of the bending strength.

TABLE 7

| Example No. | Type of fiber reinforcement | Bending strength of substrate at failure load (MPa) | Bending strength of hybrid material at first crack load (MPa) | $E_f$ (GPa) | $E_s$ (GPa) | $t_f$ (mm) | $t_s$ (mm) | $E_f/E_s$ | $E_f \cdot t_f/E_s \cdot t_s$ | Determination |
|---|---|---|---|---|---|---|---|---|---|---|
| Comparative Example 3 | carbon fiber FTS-C1-20 | 174 | 205 | 96 | 106 | 0.25 | 5.01 | 0.91 | 0.05 | X |
| Comparative Example 4 | carbon fiber FTS-C1-20 | 158 | 170 | 96 | 106 | 0.25 | 3.09 | 0.91 | 0.07 | X |
| Comparative Example 5 | carbon fiber FTS-C1-20 | 127 | 165 | 96 | 88 | 0.25 | 3.11 | 1.09 | 0.09 | X |

According to the present invention, as described above in detail, a strong hybrid material can be produced by adhering high elasticity modulus fiber layers on the surface of a high bending strength and low modulus substrate. A large modular ratio $E_f/E_s$ is an essential requirement of the present invention. However, there is a maximum limit for the fibers' modulus of elasticity. Thus, selection of low modulus but strong substrate is an important point in making a strong hybrid material. Many of the ceramics materials in which organic binders do not contain, are not suitable as a substrate material, because of their high modulus of elasticity. Therefore, present invention introduces many suitable substrate materials having high bending strength and low modulus. In other words, substrate materials having high fracture elongation.

The hybrid materials disclosed by this invention may be applied for various uses. They may be used for the body material of vehicles, airplanes, ships etc. The mix proportion and methods disclosed in Example 1 may be easily used to form shapes shown in FIG. 3. This hybrid material can also be used in parabola antennas, dome roofs etc. Furthermore, this hybrid material is also suitable as a reinforcement material for the existing columns, beams, bridges etc.

In particular, the hybrid material disclosed in the present invention is suitable for all required to have great bending strength, tensile strength, fatigue strength and impact strength.

What is claimed is:

1. A hybrid material comprising:
   a substrate prepared by curing a fabricated material made of a mixture of one or more kinds of organic binders and at least one kind of inorganic powders; and
   at least one unidirectional fiber layer which is comprised from one or more kinds of fibers, adhered to at least one of outer surfaces of the substrate by resin impregnation,
   wherein $E_f/E_s$ satisfies the following relational formula (1) and $E_f \cdot t_f / E_s \cdot t_s$ satisfies the following relational formula (2), $$E_f/E_s > 1 \qquad (1)$$

$$E_f/E_s \geq E_f \cdot t_f / E_s \cdot t_s \geq 0.15 \qquad (2)$$

where $E_f$ is bending modulus of elasticity of the resin impregnated unidirectional fiber layer, $E_s$ is bending modulus of elasticity of said substrate, $t_f$ is thickness of resin impregnated unidirectional fiber layer and $t_s$ is thickness of said substrate.

2. The hybrid material according to claim 1, wherein said organic binder is blended with said inorganic powder in a ratio of not more than 50 volume parts relative to 100 volume parts of said inorganic powders.

3. The hybrid material according to claim 1, wherein said inorganic powder is at least one kind selected from the group consisting of alumina powder, aluminum hydroxide powder, silica powder, calcium carbonate powder, calcium sulfate powder, and hydraulic cements.

4. The hybrid material according to 1, wherein at least 20 volume parts of 100 volume parts of said inorganic powders are hydraulic cements.

5. The hybrid material according to claim 3, wherein said hydraulic cements are calcium aluminate cements.

6. The hybrid material according to claim 4, wherein said hydraulic cements are calcium aluminate cements.

7. The hybrid material according to claim 1, wherein said organic binder is at least one polymer selected from the group consisting of epoxy resin, unsaturated polyester resin, vinyl ester resin, urethane resin, polyvinyl alcohol, polyacrylamide, polyamide and formaldehyde resin precursor.

8. The hybrid material according to claim 7, wherein said formaldehyde resin precursor is a substantially water insoluble formaldehyde resin precursor.

9. The hybrid material according to claim 8, wherein said substantially water insoluble formaldehyde resin precursor is any one of a phenol resin precursor, a melamine resin precursor and a urea resin precursor.

10. The hybrid material according to claim 1, wherein the fibers of said resin impregnated unidirectional fiber layer are fibers selected from the group consisting of carbon fiber, Si—Ti—C—O fiber, aramid fiber and glass fiber.

11. The hybrid material according to claim 1, wherein the resin of said impregnated unidirectional fiber layer is a polymer selected from the group consisting of epoxy resin, unsaturated polyester resin, vinyl ester resin, urethane resin and formaldehyde resin.

12. The hybrid material according to any one of claims 1, which has a bending strength of at least 30 MPa.

13. The hybrid material according to any one of claims 1, wherein said substrate has a bending modulus of elasticity of not more than 60 GPa.

14. The hybrid material according to any one of claims 1, wherein said unidirectional fiber layer impregnated with resin has a bending modulus of elasticity of at least 30 GPa.

15. The hybrid material according to claim 1, wherein said substrate is a sheet.

16. A method of manufacturing hybrid material comprising the steps of:
    adding one or more kinds of organic binders to one or more kinds of inorganic powders, forming a mixture, and kneading the mixture, thereby forming a fabricated material;
    curing said fabricated material, thereby providing a substrate; and
    adhering one or more unidirectional fiber layers, which are comprised from one or more kinds of fibers, to at least one of outer surfaces of said substrate, by resin which is impregnated in the fiber,
    wherein $E_f/E_s$ satisfies the following relational formula (1) and $E_f \cdot t_f / E_s \cdot t_s$ satisfies the following relational formula (2), $$E_f/E_s > 1 \qquad (1)$$

$$E_f/E_s \geq E_f \cdot t_f / E_s \cdot t_s \geq 0.15 \qquad (2)$$

where $E_f$ is bending modulus of elasticity of the resin impregnated unidirectional fiber layer, $E_s$ is bending modulus of elasticity of said substrate, $t_f$ is thickness of said resin impregnated unidirectional fiber layer and $t_s$ is thickness of said substrate.

17. The method according to claim 16, wherein said substrate is a sheet.

* * * * *